(12) United States Patent
Gatimu et al.

(10) Patent No.: US 9,872,046 B2
(45) Date of Patent: Jan. 16, 2018

(54) APPARATUS AND METHOD FOR RECOVERING SPATIAL MOTION VECTOR

(71) Applicant: LG Display Co., Ltd., Seoul (KR)

(72) Inventors: Kevin Gatimu, Corvallis, OR (US); Ben Lee, Corvallis, OR (US); Tae Wook Lee, Paju-si (KR); Chang Gone Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 530 days.

(21) Appl. No.: 14/020,565

(22) Filed: Sep. 6, 2013

(65) Prior Publication Data

US 2015/0071355 A1    Mar. 12, 2015

(51) Int. Cl.
*H04N 19/51* (2014.01)
*H04N 19/895* (2014.01)
*H04N 19/513* (2014.01)

(52) U.S. Cl.
CPC ......... *H04N 19/895* (2014.11); *H04N 19/521* (2014.11)

(58) Field of Classification Search
None
See application file for complete search history.

(56) References Cited

U.S. PATENT DOCUMENTS

| | | | |
|---|---|---|---|
| 6,480,546 B1 * | 11/2002 | Kim et al. | 375/240.27 |
| 8,160,145 B2 | 4/2012 | Bull et al. | |
| 2005/0190843 A1 * | 9/2005 | Lee | 375/240.16 |
| 2006/0013320 A1 | 1/2006 | Oguz et al. | |
| 2006/0062304 A1 * | 3/2006 | Hsia | 375/240.16 |
| 2006/0269153 A1 * | 11/2006 | Shi et al. | 382/236 |
| 2007/0086527 A1 * | 4/2007 | Yan | 375/240.24 |
| 2008/0049845 A1 * | 2/2008 | Liu | 375/240.27 |
| 2008/0084934 A1 * | 4/2008 | Agrawal | 375/240.27 |
| 2009/0213940 A1 * | 8/2009 | Steinbach et al. | 375/240.27 |
| 2009/0220004 A1 * | 9/2009 | Cieplinski et al. | 375/240.16 |
| 2010/0322309 A1 | 12/2010 | Huang et al. | |
| 2013/0039424 A1 * | 2/2013 | Le Floch et al. | 375/240.16 |

FOREIGN PATENT DOCUMENTS

| | | |
|---|---|---|
| CN | 102111622 A | 6/2011 |
| CN | 102984525 A | 3/2013 |
| CN | 103024402 A | 4/2013 |
| CN | 103167291 A | 6/2013 |
| CN | 103220533 A | 7/2013 |

* cited by examiner

*Primary Examiner* — Andy Rao
*Assistant Examiner* — Samuel D Fereja
(74) *Attorney, Agent, or Firm* — Birch, Stewart, Kolasch & Birch, LLP (57) ABSTRACT

Discussed is an apparatus for recovering a motion vector to perform error concealment on received video stream, including: a first selecting unit selecting a first motion vector from a first slice that is above a lost slice, and selecting a second motion vector from a second slice that is below the lost slice; a second selecting unit determining at least one first orthogonal motion vector that is orthogonal to the first motion vector, and determining at least one second orthogonal motion vector that is orthogonal to the second motion vector; and a recovering unit computing a lost motion vector, comprised in the lost slice, using a weighted average of valid motion vectors, wherein the valid motion vectors include at least one of the first motion vector, the second motion vector, the first orthogonal motion vector, and the second orthogonal motion vector.

9 Claims, 12 Drawing Sheets

|  | Low1 | Low2 | Med1 | Med2 | High1 | High2 |
|---|---|---|---|---|---|---|
| Title | Beautiful Nature | Planet Earth | X-Games (snow) | X-Games (ramp) | Africa Cats | X-Games (skate) |
| Bitrate (Mbps) | 9.6 | 9.3 | 10 | 11.2 | 16.6 | 13.1 |
| fps | 29.97 | 29.97 | 23.98 | 23.98 | 23.98 | 23.98 |

| Videos | Methods | Contribution of Individual EC Technique (%) | | | | |
|---|---|---|---|---|---|---|
| | | Zero MV | Mean MV | Median MV | Last MV | WNVMVA |
| Low1 | Default | 13.6 | 10.4 | 14.9 | 61.1 | - |
| | CMVR | 2.9 | 11.9 | 5.0 | 34.6 | 45.6 |
| Low2 | Default | 13.6 | 8.3 | 22.3 | 55.6 | - |
| | CMVR | 1.8 | 6.9 | 7.8 | 28.7 | 54.9 |
| Med1 | Default | 22.8 | 8.8 | 39.0 | 29.4 | - |
| | CMVR | 0.9 | 5.8 | 18.6 | 21.9 | 52.7 |
| Med2 | Default | 18.2 | 7.6 | 29.6 | 44.5 | - |
| | CMVR | 3.7 | 7.5 | 18.2 | 23.6 | 47.0 |
| High1 | Default | 25.4 | 11.0 | 40.6 | 23.0 | - |
| | CMVR | 6.0 | 5.7 | 25.7 | 17.6 | 45.0 |
| High2 | Default | 23.4 | 10.8 | 39.1 | 26.7 | - |
| | CMVR | 4.3 | 5.1 | 18.6 | 17.0 | 54.9 |

APPARATUS AND METHOD FOR RECOVERING SPATIAL MOTION VECTOR

BACKGROUND

Field of the Invention

The present invention relates to an apparatus and method for recovering spatial motion vector of received video stream.

Discussion of the Related Art

Mobile devices are becoming more prevalent and complex. As a result, the wireless communication aspect of these devices is becoming increasingly significant. At the same time, video demands in terms of availability and quality are also on the uprise. High definition (HD) video is the standard of choice for meeting today's video demands. However, HD video is characterized by high data rates. HD video compressed using H.264 can be wirelessly streamed via 802.11 wireless networks. However, such wireless networks are prone to packet losses, which result in degraded perceptual quality of video. It is thus important to perform error concealment in order to improve the visual quality of degraded video.

SUMMARY

Accordingly, the present invention is directed to provide an apparatus and method for recovering spatial motion vector of received video stream that substantially obviates one or more problems due to limitations and disadvantages of the related art.

An aspect of the present invention is directed to provide an apparatus and method for recovering spatial motion vector of received video stream, which perform error concealment on received video stream.

In addition to the aforementioned objects of the present invention, other features and advantages of the present invention will be described below, which will be clearly understood by those skilled in the art from descriptions below.

In addition to the aforementioned features and effects of the present invention, other features and effects of the present invention can be newly construed from the embodiments of the present invention.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for recovering a motion vector to perform error concealment on received video stream, comprising: a first step selecting a first motion vector from a first slice that is above a lost slice, and selecting a second motion vector from a second slice that is below the lost slice; a second step determining at least one first orthogonal motion vector that is orthogonal to the first motion vector, and determining at least one second orthogonal motion vector that is orthogonal to the second motion vector; and a third step computing a lost motion vector, comprised in the lost slice, using a weighted average of valid motion vectors, wherein the valid motion vectors comprising at least one of the first motion vector, the second motion vector, the first orthogonal motion vector, and the second orthogonal motion vector.

In another aspect of the present invention, an apparatus for recovering a motion vector to perform error concealment on received video stream, comprising: a first selecting unit selecting a first motion vector from a first slice that is above a lost slice, and selecting a second motion vector from a second slice that is below the lost slice; a second selecting unit determining at least one first orthogonal motion vector that is orthogonal to the first motion vector, and determining at least one second orthogonal motion vector that is orthogonal to the second motion vector; and a recovering unit computing a lost motion vector, comprised in the lost slice, using a weighted average of valid motion vectors, wherein the valid motion vectors comprising at least one of the first motion vector, the second motion vector, the first orthogonal motion vector, and the second orthogonal motion vector.

It is to be understood that both the foregoing general description and the following detailed description of the present invention are exemplary and explanatory and are intended to provide further explanation of the invention as claimed. Further, research for the invention was supported in part by LCD Laboratory, LG Display Co., Ltd., and the Ministry of Education Science and Technology (MEST).

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, an apparatus and a method for recovering a motion vector according to the present invention will be described in detail with reference to the accompanying drawings.

The present invention based on the macroblock (MB) candidate system, provides a new motion vector (MV) recovery technique called Weighted Nearest Valid MV Averaging (WNVMVA). The WNVMVA is proposed to supplement the default set of MV candidates (i.e., mean MV, median MV, last MV, and zero MV techniques). The combination of the default techniques and the new technique will be referred to as Competitive Motion Vector Recovery (CMVR).

The goal of WNVMVA is to exploit the spatial relationships among MVs by using only valid MVs, i.e., only properly received and decoded MVs, which are spatially closest to the lost MVs. In contrast, MVs could be invalid due to intra-coding or packet loss. The spatially closest valid MVs are then used to estimate lost MVs. Estimated MVs are excluded from WNVMVA as they fail to accurately represent the spatial characteristics of MVs. Therefore, by analyzing only valid MVs, it is possible to expose more accurate spatial relationships among MVs.

Figure 1:
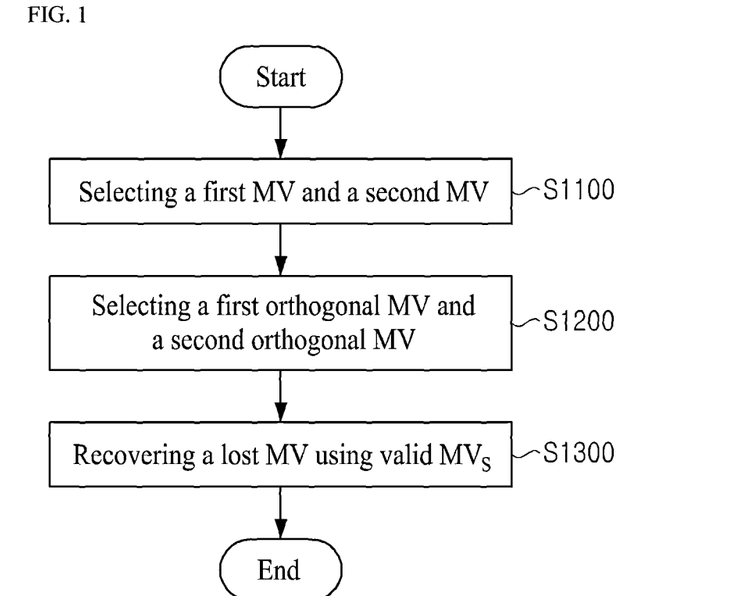
FIG. 1 illustrates an embodiment of the method for recovering a motion vector according to the present invention.

FIG. 1 illustrates an embodiment of the method for recovering a motion vector according to the present invention As seen in FIG. 1, in operation 1100, the method for recovering a motion vector according to the present invention selecting a first MV and a second MV.

For each MB in a lost slice, the present invention initially selects one valid MV (the first MV) from the slice above and another valid MV (the second MV) from the slice below. This is shown in FIG. 2.

Figure 2:
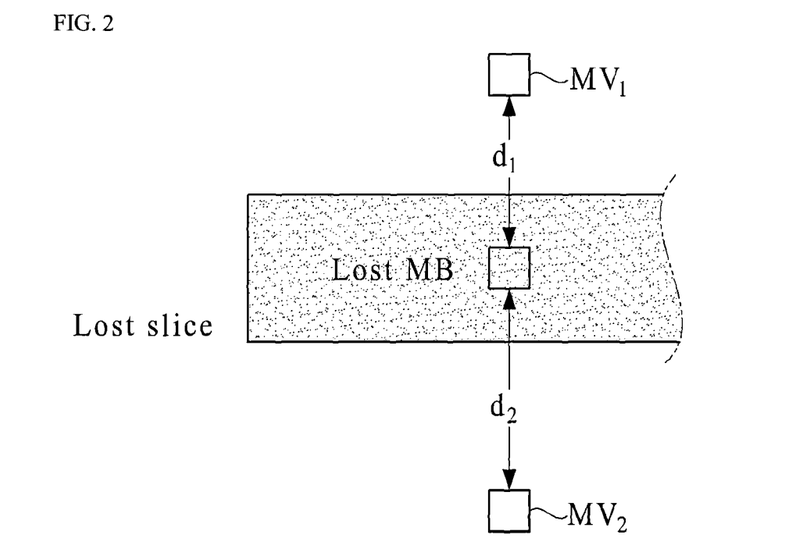
FIG. 2 illustrates positions and distances of the first motion vector and the second motion vector relative to the lost macroblock.

FIG. 2 illustrates positions and distances of the first motion vector and the second motion vector relative to the lost macroblock. As seen in FIG. 2, this selection is done based on the availability of properly received and decoded slices. For instance, if the slice above the lost slice is the first slice in the frame and it is also lost, then only the bottom valid MV is considered. The top valid MV will be referred to as MV1 and the bottom valid MV will be called MV2, and both are the spatially closest to the lost MV in the vertical direction. The distances between the positions of MV1 and MV2 and the lost MB are d1 and d2, respectively. Note that MVs for MBs between the lost MB and the MB for MV1 (and also for the MB for MV2) are assumed to be not valid because either they are lost or are intra-coded and thus no MVs exist for these MBs.

The corresponding valid MVs in the horizontal direction are usually unavailable in the context of H.264 video that has experienced packet loss. This is because lost visual information stretches across the whole frame. When H.264 video is corrupted, part of a slice, an entire slice, or multiple slices are lost. However, some lost slice regions could start or end in the middle of a frame, which would result in some horizontally available valid MVs. But this availability would be limited to only a small portion of the total number of lost MBs—those in the top and bottom rows of the lost slice. For example, a typical frame in a HD video contains 8 slices and each slice consists of 8 or 9 rows of MBs. If one of these slices begins or ends in mid-frame, then only about half of the MBs in a row (less than 10% of the total MBs in a slice) would have horizontally neighboring valid MVs. Therefore, in general, there are very few available valid MVs in the horizontal direction from the perspective of a lost MB.

As seen in FIG. 1, in operation 1200, the method for recovering a motion vector according to the present invention selecting a first orthogonal MV and a second orthogonal MV.

Once MV1 and MV2 are established, their respective orthogonal neighboring valid MVs (i.e., the first orthogonal MV and the second orthogonal MV), if available, are then determined. This process is illustrated in FIG. 3.

Figure 3:
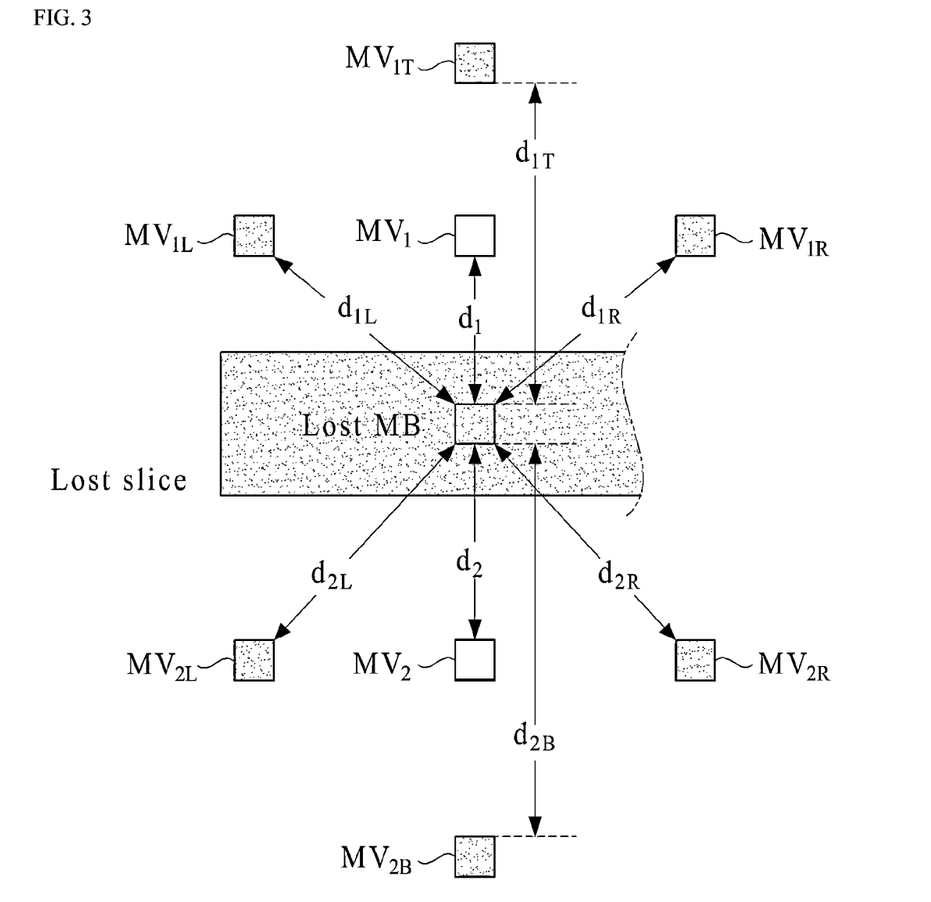
FIG. 3 illustrates the first motion vector, the second motion vector, and their neighbors that are used to estimate the value of the lost motion vector via inverse distance weighting.

FIG. 3 illustrates the first motion vector, the second motion vector, and their neighbors that are used to estimate the value of the lost motion vector via inverse distance weighting (IDW).

As seen in FIG. 3, the nearest valid neighbors for MV1 are the left neighbor, MV1L; the right neighbor, MV1R; and the top neighbor, MV1T. Similarly, the nearest valid neighbors for MV2 are the left neighbor, MV2L; the right neighbor, MV2R; and the bottom neighbor, MV2B. Again, any MVs that may exist between MV1, or MV2, and its nearest valid neighbor, are considered invalid because they are either intra-coded or lost. The MV for the lost MB could be estimated based solely on MV1 and MV2. However, the orthogonal neighboring valid MVs of MV1 and MV2 provide complimentary spatial dependence information that is useful in more accurately estimating the lost MV. By considering not only MV1 and MV2, but also their neighbors, the process of estimating the lost MV is more representative of the spatial characteristics of the MVs. Furthermore, the left and right neighbors, in particular, account for horizontal spatial dependence. This choice compensates for the absence of valid MVs that horizontally neighbor the lost MV.

As seen in FIG. 1, in operation 1300, the method for recovering a motion vector according to the present invention recovering a lost MV using valid MVs.

Figure 4:
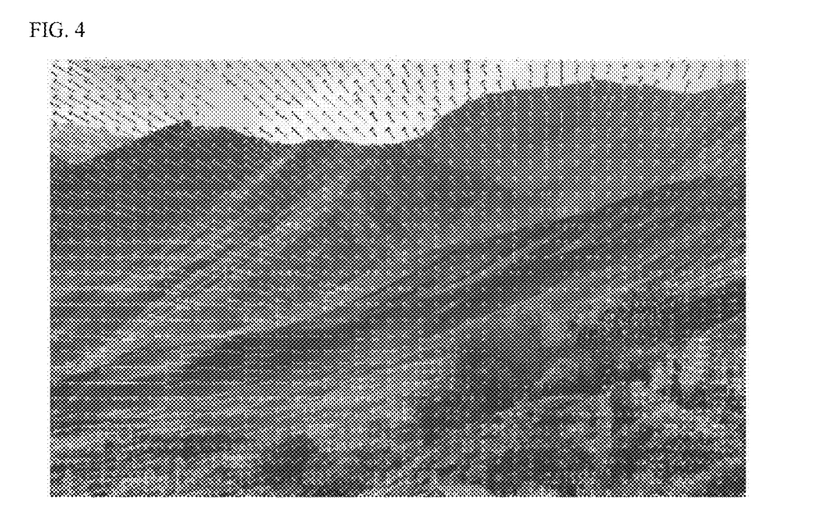
FIG. 4 illustrates motion vector's spatial relationship relative to distance.

An estimate for the lost MV is then computed using MV1 and MV2 and their valid orthogonal neighbors. This is performed via inverse distance weighting (IDW), which is an interpolation technique that estimates values of unknown points using a weighted average of known points. The weight of each valid MV is inversely proportional to the distance between that MV and the unknown MV. This inverse relationship is based on the assumption that MVs that are closer together are more spatially dependent than MVs that are further from one another. A simple graphical illustration of this idea can be seen in FIG. 4, which is a zoomed-in section of a video frame with overlaid MVs. As can be seen from FIG. 4, the MVs exhibit greater similarity the closer they are and greater disparity the further apart they are. Therefore, the shorter the distance between a properly decoded MV and a lost MV, the greater the impact it has on the estimation of the lost MV.

The choice of the valid MVs for the present invention can also be mathematically analyzed by measuring the spatial autocorrelation among them. Spatial autocorrelation statistically measures how spatially dependent the valid MVs are based on their values and their relative locations in the frame. The goal is to achieve positive dependence among the valid MVs, which would justify not only their choice, but also the IDW formula. In order to perform spatial autocorrelation statistics, Moran's I is employed, which is an index whose value ranges from −1 (perfect dispersion) to +1 (perfect correlation). The zero value indicates a random spatial relationship. Moran's I is defined as below equation.

$$I = \frac{N}{\sum_i \sum_j} \frac{\sum_i \sum_j w_{ij}(X_i - \overline{X})(X_j - \overline{X})}{\sum_i (X_i - \overline{X}^2)},$$

where N is the number of valid MV values indexed by i and j according to MBs' (x; y) coordinates in a frame, X is the variable representing MV values, $\overline{x}$ is the mean of X, and wij is an element of a spatial weights matrix (SWM) of size N×N.

In order to illustrate the use of Moran's I equation, consider the case when all 8 valid MVs are available. Moreover, for the sake of Moran's I analysis, the supposedly lost MV is also considered by obtaining its value from the uncorrupted version of the video. This results in a total of 9 properly decoded MVs, where the 8 valid MVs will be tested for spatial dependence relative to the actual value and position of the supposedly lost MV. By quantifying this spatial dependence, it is possible to construct a model based on IDW that reliably estimates the value of the lost MV.

A total of 9 MVs implies that N=9. Therefore, the SWM is a 9×9 matrix that expresses the potential for interaction (i.e., potential of spatial dependence) between MV values at each pair of i; j locations. Each of these interactions is represented in form of a weight. The matrix below shows a general 9×9 SWM. By definition, diagonal elements (wii) of the SWM are set to zero while the rest of the elements (wij) are calculated as distance-based weights.

$$\begin{pmatrix} w_{11} & w_{12} & \cdots & w_{19} \\ w_{21} & w_{22} & \cdots & w_{29} \\ \vdots & \vdots & \ddots & \vdots \\ w_{91} & w_{92} & \cdots & w_{99} \end{pmatrix}$$

Figure 5:
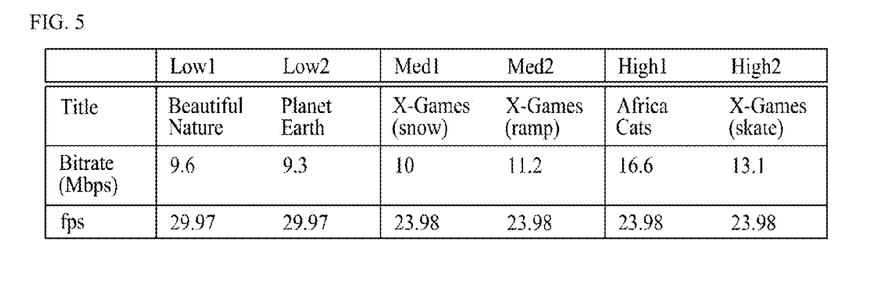
FIG. 5 illustrates the specification of 1080p HD test videos.
Figure 6:
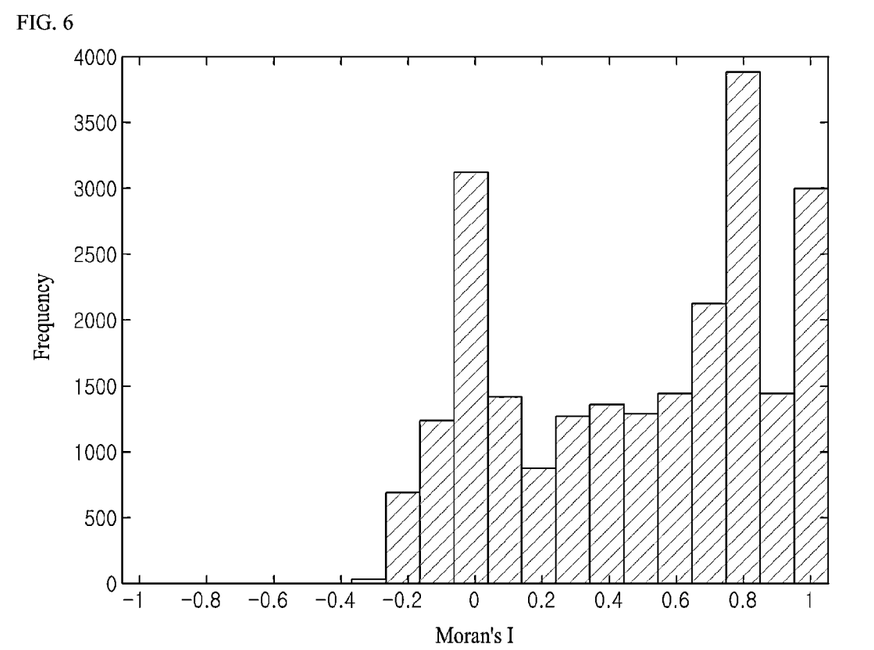
FIG. 6 illustrates a histogram of Moran's I values, ranging from −1 to +1.

Each distance-based weight is the inverse of the MB distance between two MVs. For example, the spatial weight relationship between MV1 and MV1L is represented by element w12 in the SWM. Assuming that these MVs are, say, 5 MBs apart, then w12=⅕. Once the SWM has been established, Moran's I is calculated for each MV in the frame. This is done separately for both x and y components of the MV values. FIG. 6 shows a typical distribution of Moran's I values for MV y-component values for the X-Games (skate) test video (see FIG. 5). Similar behavior can be seen not only for the corresponding x-component values, but also for the other frames in X-Games (skate) as well as the other test videos. From FIG. 6, it can be seen that most of the Moran's I values are positive and concentrated around 0.8. This corresponds to a strong indication of positive spatial autocorrelation among MV values according to the IDW relationship that is used to construct the SWM for calculating the Moran's I values. Note that even though there is a significant number of Moran's I values at zero, which is mainly due to the default assignment of zero Moran's I values to intra-coded MBs (which have no MV values) and MVs that do not have valid neighboring MVs. Therefore, the zero values, in this case, are not a true reflection of random spatial association, as expected when analyzing Moran's I values. Taking all this into consideration, the results or spatial autocorrelation analysis via Moran's I, as illustrated in FIG. 6, support the estimation of the lost MV via and IDW-based formula. The result is the WNVMVA formula, which is shown below.

$$\frac{\sum_i w_i MV_i}{\sum_i w_i}, \text{ where}$$

$$i \in \{1, 1L, 1R, 1T, 2, 2L, 2R, 2B\}$$

$$w_i = \frac{1}{d_i}$$

Figure 7:
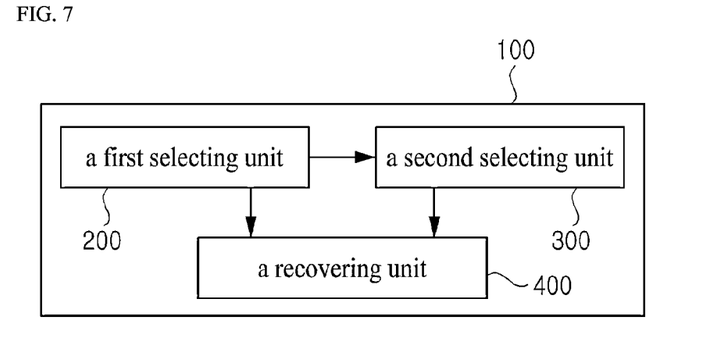
FIG. 7 illustrates an embodiment of the apparatus for recovering a motion vector according to the present invention.

FIG. 7 illustrates an embodiment of the apparatus for recovering a motion vector according to the present invention As seen in FIG. 7, the apparatus for recovering a motion vector according to the present invention comprise a first selecting unit 200, a second selecting unit 300, and a recovering unit 400.

The first selecting unit 200 selects a first motion vector from a first slice that is above a lost slice, and selects a second motion vector from a second slice that is below the lost slice.

The first selecting unit 200 selects the first motion vector that is spatially closest to the lost motion vector, and selects the second motion vector that is spatially closest to the lost motion vector.

The second selecting unit 300 determines at least one first orthogonal motion vector that is orthogonal to the first motion vector, and determines at least one second orthogonal motion vector that is orthogonal to the second motion vector.

The second selecting unit 300 determines at least one of a first left motion vector, a first top motion vector, and a first right motion vector as the first orthogonal motion vector, and determines at least one of a second left motion vector, a second bottom motion vector, and a second right motion vector as the second orthogonal motion vector, wherein the first left motion vector is closest to the left side of the first motion vector, the first top motion vector is closest to the top side of the first motion vector, the first right motion vector is closest to the right side of the first motion vector, the second left motion vector is closest to the left side of the second motion vector, the second bottom motion vector is closest to the bottom side of the second motion vector, the second right motion vector is closest to the right side of the second motion vector.

The recovering unit 400 computes a lost motion vector, comprised in the lost slice, using a weighted average of valid motion vectors, wherein the valid motion vectors comprising at least one of the first motion vector, the second motion vector, the first orthogonal motion vector, and the second orthogonal motion vector.

The recovering unit 400 computes the lost motion vector using inverse distance weighting (IDW) that is an interpolation that estimates the lost motion vector using a weighted average of the valid motion vectors, a weight of each valid motion vectors is inversely proportional to the distance between each valid motion vectors and the lost motion vector.

The lost motion vector is calculated as expressed in the following equation $$\frac{\sum_i w_i MV_i}{\sum_i w_i},$$

wherein $W_i$ is the weight, and $MV_i$ is each valid motion vector.

<Evaluation>

In order to evaluate WNVMVA, videos exhibiting different levels of speed in overall motion characteristics are used, which are classified as low speed, medium speed, and high speed. Two 1080p HD H.264 videos are used for each speed for a total of six videos. FIG. 5 outlines the different videos used and their characteristics. Each video is about 2 seconds long.

Figure 8A:
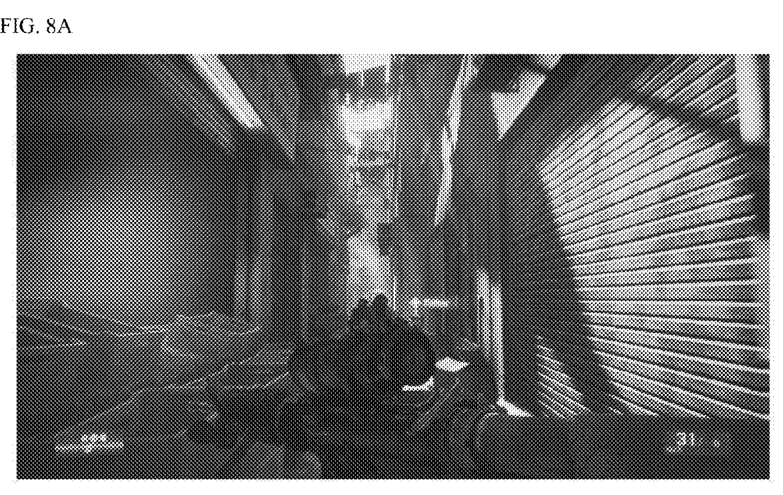
FIG. 8A and FIG. 8B illustrate comparison between original frame and corrupted frame with missing slice information due to network packet loss.
Figure 8B:
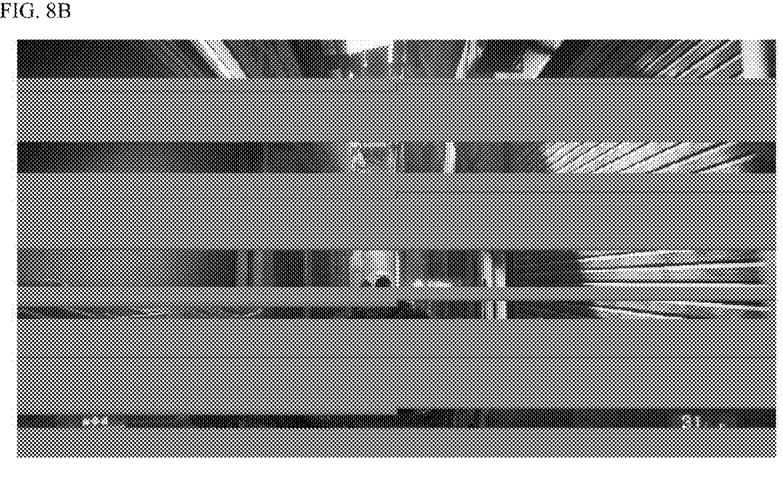
Figure 9A:
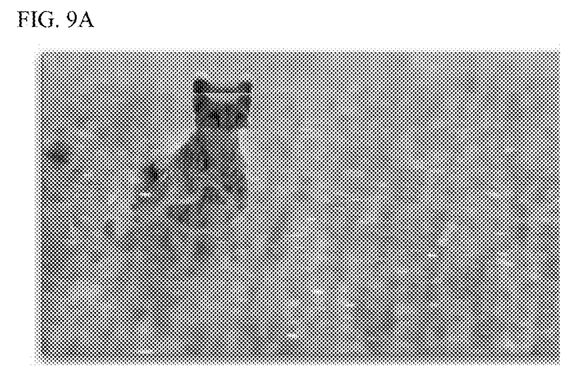
FIG. 9A to FIG. 9E illustrate comparison against pre-existing EC techniques.
Figure 9B:
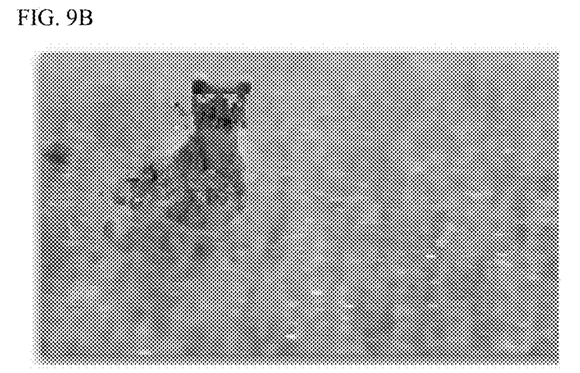
Figure 9C:
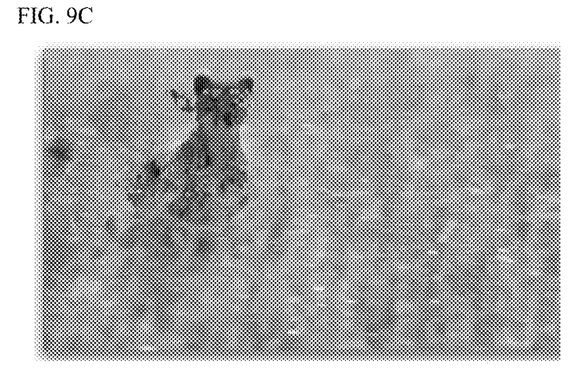
Figure 9D:
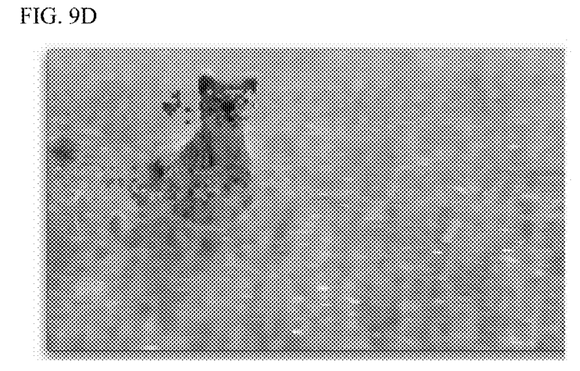
Figure 9E:
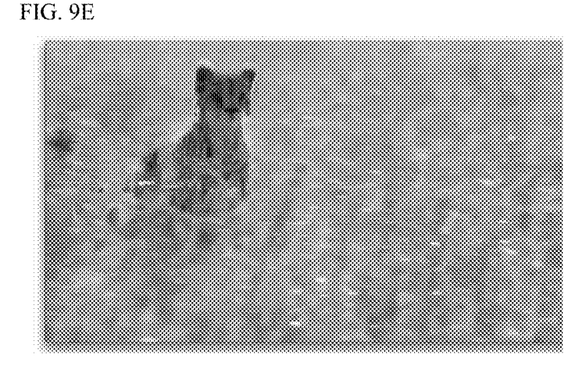
Figure 10A:
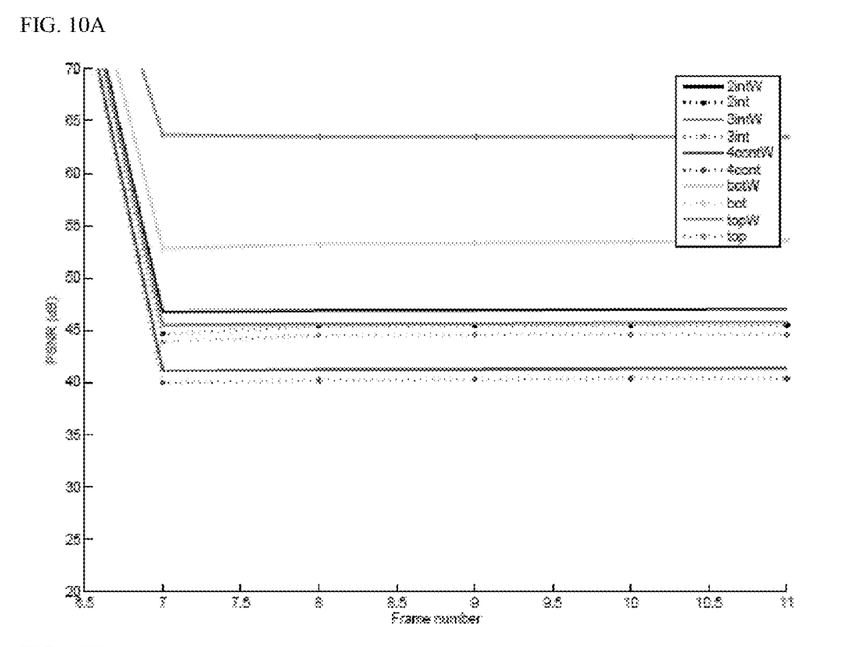
FIG. 10A to FIG. 10F illustrate measurements for 6 test videos with 5 loss scenarios concealed using CMVR.
Figure 10B:
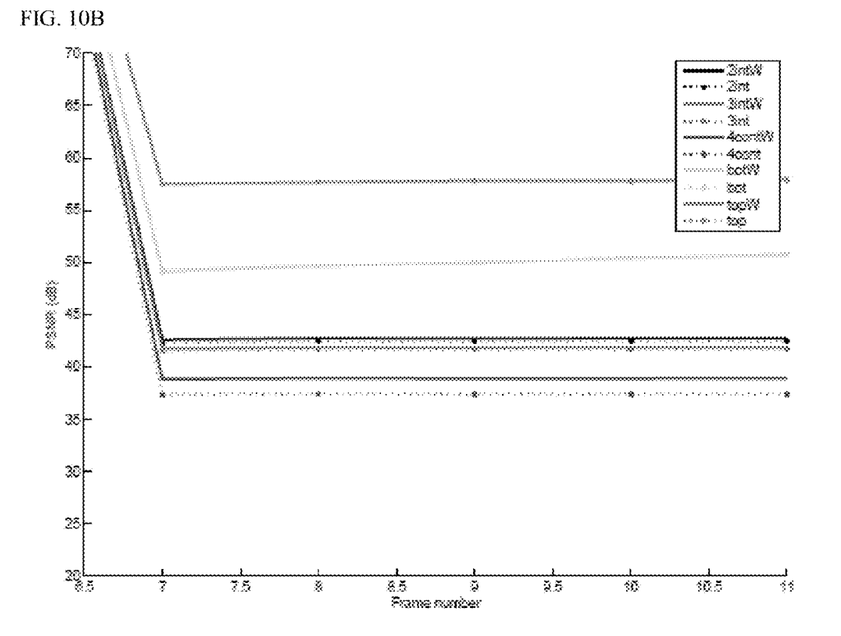
Figure 10C:
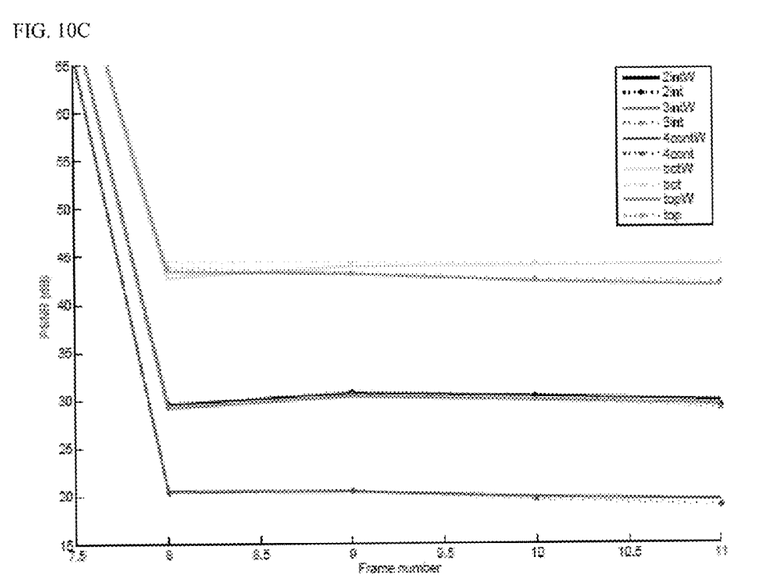
Figure 10D:
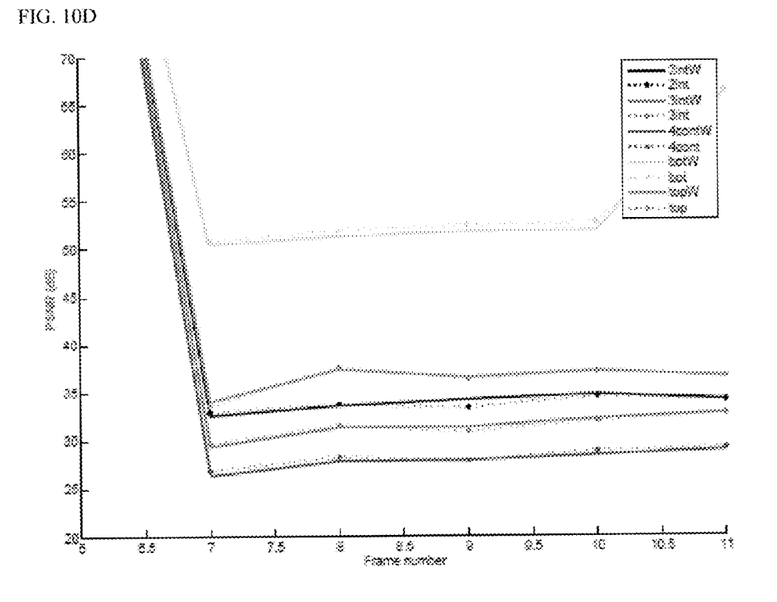
Figure 10E:
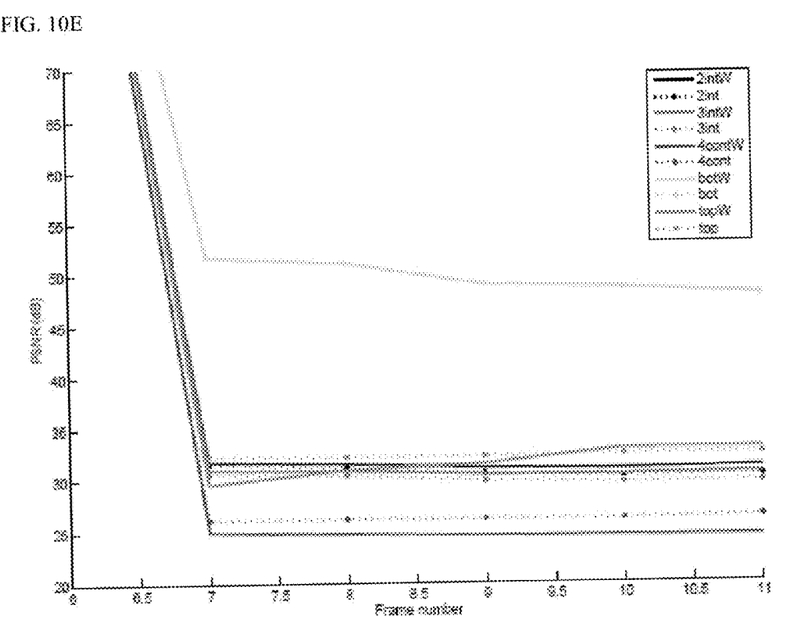
Figure 10F:
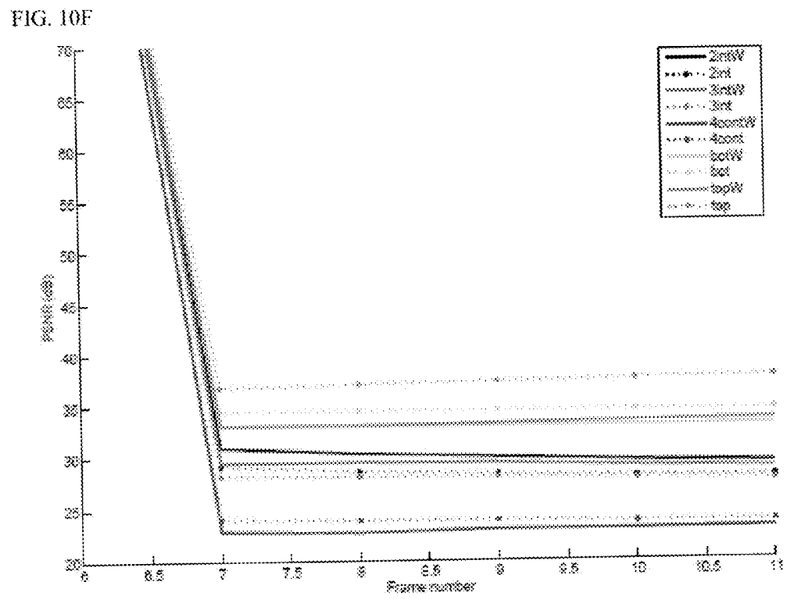

The test videos are created by simulating data loss in the videos in FIG. 5. An H.264 bitstream contains headers and start codes for each NAL Unit. Therefore, it is possible to simulate data loss by isolating and removing picture slices since they correspond directly to NAL Units. FIGS. 8A and 8B show an I-frame with missing slice information due to an actual 802.11 wireless streaming experiment in our previous work on the evaluation of wireless HD video technology. It can be seen that the losses are slice-based due to the relationship between slices and NAL Units and how they directly correlate with RTP packets. Each test video is re-encoded at bit rates of 10 to 15 Mbps and without B-frames using the open-source H.264 encoder x264. This produces raw H.264 bitstreams, which can be modified at slice level for the purpose of simulating data loss as described in Section 2.2. Editing the raw H.264 bitstreams is done in hexadecimal mode, which contains start codes corresponding to P-frame slices. The first slice of each P-frame has the start code 0x0000000141, while the rest of the seven slices of the same frame are each preceded by the code 0x00000141. These codes are the basis for navigating through frames and slices within the raw H.264 bitstream. For each of the videos, five different types of losses are simulated as follows:

1. Two intermittent slices (2int)
2. Three intermittent slices (3int)
3. Four continuous slices (4cont)
4. Top slice (top)
5. Bottom slice (bot)

These videos are then decoded and concealed using CMVR, which includes WNVMVA. The decoded results are compared against their corresponding original uncorrupted versions and PSNR measurements recorded. In order to demonstrate the visual significance of WNVMVA, the techniques that make up CMVR are individually compared as visually shown in FIG. 9A to 9E. This is done by isolating each of the EC techniques and concealing a single corrupted frame. It can be seen that WNVMVA exhibits the best visual quality and thus in general be useful within the MB candidate system of CMVR. Zero MV, however, exhibits copied slices from a different frame. Also, the other methods (mean MV, median MV and last MV) exhibit artifacts which consist of misplaced MBs from the cheetah's body due to poor MV estimation.

The PSNR comparisons for the six different videos, each with the five different loss scenarios, are shown in FIG. 10A to 10F. For each video, the tenth frame is corrupted, which is when video quality starts to degrade. These results compare CMVR for all five loss scenarios (2int, 3int, 4cont, top, and bot) against the default method (i.e., CMVR without WNVMVA). The legends corresponding to CMVR are appended with a W to imply the inclusion of WNVMVA.

Figure 12A:
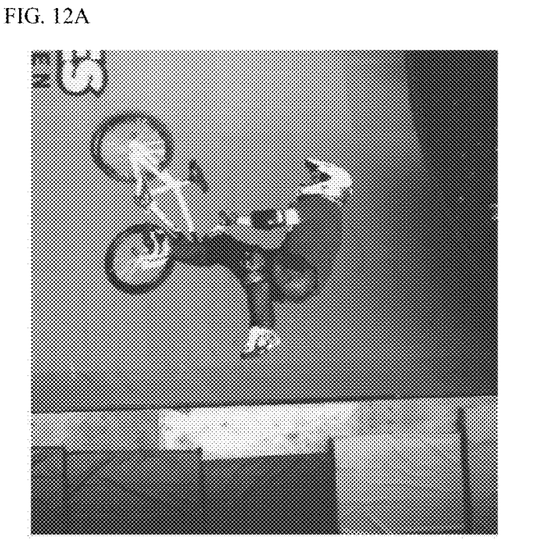
FIG. 12A to FIG. 12C illustrate comparison between the original frame and the corrupted frame for the 3int case of Med2 concealed with both the default method and CMVR.
Figure 12B:
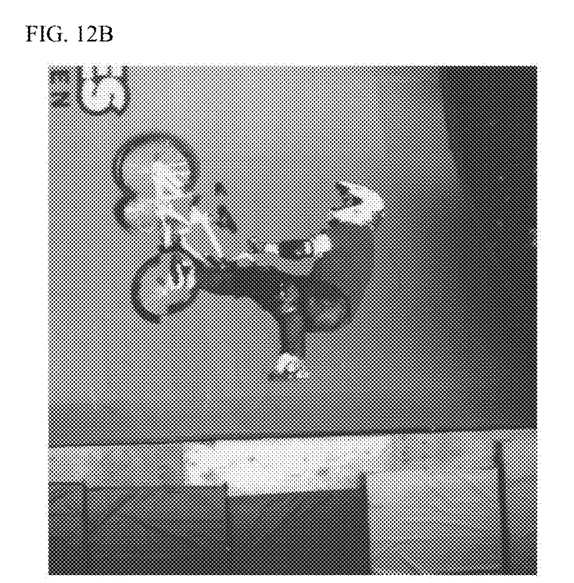
Figure 12C:
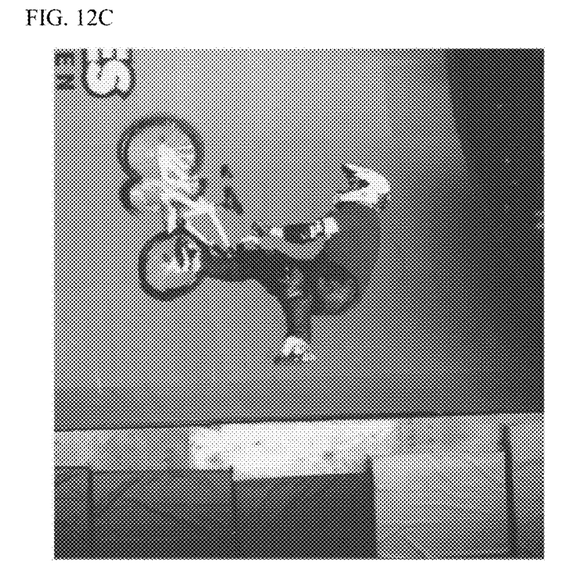

It can be seen that the amount of video degradation is proportional to the number of lost slices. This can be inferred from the fact the average PSNR for each video drops in the following order: top/bot, 2int, 3int, and 4cont. CMVR offers PSNR improvement over the default method for most cases by 0.5 dB to 2 dB. For example, FIG. 12A to 12C illustrates the visual improvement of employing CMVR over the default method for the 3int case for the Med2 clip. Only a portion of the corrupted frame is considered in order to highlight the differences.

The major exception to the improvement offered by WNVMVA is some of the 4cont cases, where CMVR degrades video by up to 2 dB. These cases include 4cont for High1, High2, and Med2. This goes against logic as CVMR with WNVMVA should always perform better that the default method. However, this occurs because the decoder may choose WNVMVA-based candidates due to the following two related reasons. First, WNVMVA depends on the spatial dependence of valid MVs above and below a lost slice region. Therefore, the larger the lost slice region, the further apart the valid MVs and thus they are less spatially dependent. This results in less accurate MV estimation via WNVMVA. Second, WNVMVA is reliable up to a certain degree due to the limited efficiency of BMA. That is, WNVMVA-based MVs could end up generating MBs that have better BMA performance within their immediate surroundings but end up degrading the overall quality of the video. The choice of WNVMVA over the default methods can be improved in such cases by improving the BMA algorithm.

Figure 11:
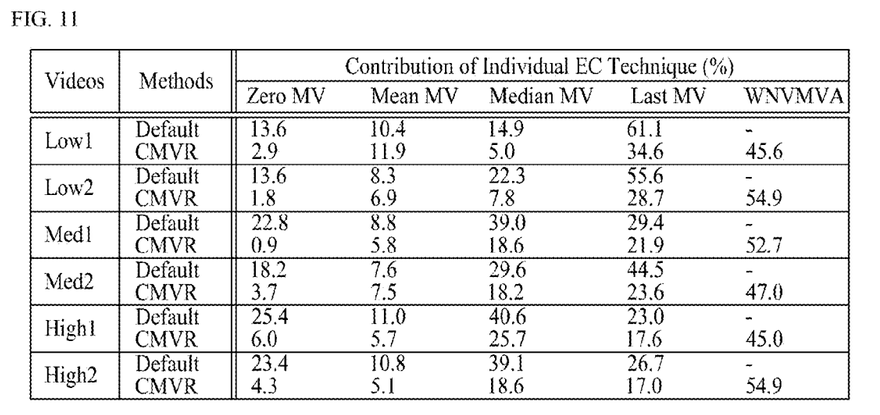
FIG. 11 illustrates percentage distribution of concealed MBs using recovered MVs for the default method and CMVR for six test videos.

As discussed earlier, CMVR is a combination of existing methods (zero MV, mean MV, median MV, and last MV) and our invention, WNVMVA. This means that for every lost MB, there is a total of five possible MB candidates. FIG. 11 shows the percentage distribution of total number of concealed MBs using all five EC techniques. FIG. 11 also shows the percentage distribution for the four EC techniques used in the default method as a comparison. As can be seen, WNVMVA offers decent improvement by complimenting the four preexisting MV recovery techniques. WNVMVA contributes significantly towards EC across all the videos—approximately 50% of CMVR. This shows that there is a considerable amount of spatial dependence between lost MVs and surrounding valid MVs.

The future of H.264 HD video over 802.11 wireless networks is viable, especially with efforts to improve 802.11 coupled with increasing video demands. Due to the lossy nature of 802.11 wireless networks and the high susceptibility of H.264 video to these losses, proper EC is an important process in wireless HD video transmission. Lost MVs can be estimated based on the available MVs within the same space (frame) by exploiting the spatial relationships of MVs. In this document, a new invention, WNVMNVA, has been shown to capture the spatial dependence among MVs by exclusively analyzing valid MVs. In addition, WNVMVA, has proved to be a reliable compliment to existing MV recovery EC techniques, which utilize error-prone estimated MVs.

There is further opportunity for improving MV recovery by exploiting temporal redundancies and addressing additional factors within the spatial domain, such as more complex characterization of available MVs and also incorporation of intra-coded MBs into an EC scheme.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for recovering a motion vector to perform error concealment on received video stream, the method comprising:

selecting a first valid motion vector from a first slice that is spatially closest to a lost motion vector within a same frame and above a lost slice, and selecting a second valid motion vector from a second slice that is spatially closest to the lost motion vector within the same frame and below the lost slice;

determining at least one first neighboring valid motion vector within the same frame that is a nearest valid motion vector adjacent to the first valid motion vector;

determining at least one second neighboring valid motion vector within the same frame that is a nearest valid motion vector adjacent to the second valid motion vector; and generating a recovered motion vector of the lost motion vector, comprised in the lost slice, using a weighted average of valid motion vectors including at least the first valid motion vector, the second valid motion vector, the first neighboring valid motion vector, and the second neighboring valid motion vector, wherein a weight of each of the valid motion vectors is inversely proportional to a spatial distance within the same frame between each of the valid motion vectors and the lost motion vector, wherein the valid motion vectors are properly decoded motion vectors within the same frame that do not include any intra-coded motion vectors and are not based on error concealment information of other lost motion vectors, and wherein at least one of the first or second valid motion vectors is located between the lost motion vector and at least one of the first or second neighboring valid motion vectors within the same frame.

2. The method of claim 1, wherein the weighted average of the valid motion vectors uses inverse distance weighting (IDW) that is an interpolation that estimates the lost motion vector using a weighted average of the valid motion vectors.

3. The method of claim 2, wherein the lost motion vector is calculated as expressed in the following equation $$\frac{\sum_i w_i MV_i}{\sum_i w_i},$$

wherein $W_i$, is the weight, and $MV_i$, is each valid motion vector.

4. The method of claim 1, further comprising:

determining at least one of a first left valid motion vector, a first top valid motion vector, and a first right valid motion vector as the first neighboring valid motion vector, and determining at least one of a second left valid motion vector, a second bottom valid motion vector, and a second right valid motion vector as the second neighboring valid motion vector, wherein the first left valid motion vector is closest to the left side of the first valid motion vector, the first top valid motion vector is closest to the top side of the first valid motion vector, the first right valid motion vector is closest to the right side of the first valid motion vector, and wherein the second left valid motion vector is closest to the left side of the second valid motion vector, the second bottom valid motion vector is closest to the bottom side of the second valid motion vector, the second right valid motion vector is closest to the right side of the second valid motion vector.

5. The method of claim 1, wherein the determining at least one first neighboring valid motion vector within the same frame includes determining a first top left valid motion vector, a first top middle valid motion vector, and a first top right valid motion vector as first neighboring valid motion vectors, wherein the first top left valid motion vector is closest to the left side of the first valid motion vector, the first top middle valid motion vector is closest to the top side of the first valid motion vector, the first top right valid motion vector is closest to the right side of the first valid motion vector, wherein the determining at least one second neighboring valid motion vector within the same frame includes determining a second bottom left valid motion vector, a second bottom middle valid motion vector, and a second bottom right valid motion vector as second neighboring valid motion vectors, wherein the second bottom left valid motion vector is closest to the left side of the second valid motion vector, the second bottom middle valid motion vector is closest to the bottom side of the second valid motion vector, the second bottom right valid motion vector is closest to the right side of the second valid motion vector, and wherein the recovered motion vector of the lost motion vector is generated based on a weighted average of valid motion vectors including the first valid motion vector, the second valid motion vector, the first top left valid motion vector, the first top middle valid motion vector, the first top right valid motion vector, the second bottom left valid motion vector, the second bottom middle valid motion vector, and the second bottom right valid motion vector.

6. An apparatus for recovering a motion vector to perform error concealment on received video stream, the apparatus comprising:

a first selecting unit configured to select a first valid motion vector that is spatially closest to a lost motion vector within a same frame and from a first slice that is above a lost slice, and select a second valid motion vector that is spatially closest to the lost motion vector within the same frame and from a second slice that is below the lost slice;

a second selecting unit configured to determine at least one first neighboring valid motion vector within the same frame that is a nearest valid motion vector adjacent to the first valid motion vector, and determine at least one second neighboring valid motion vector within the same frame that is a nearest valid motion vector adjacent to the second motion vector; and a recovering unit configured to generate a recovered motion vector of the lost motion vector, comprised in the lost slice, using a weighted average of valid motion vectors including at least the first valid motion vector, the second valid motion vector, the first neighboring valid motion vector, and the second neighboring valid motion vector, wherein a weight of each of the valid motion vectors is inversely proportional to a spatial distance within the same frame between each of the valid motion vectors and the lost motion vector, wherein the valid motion vectors are properly decoded motion vectors within the same frame that do not include any intra-coded motion vectors and are not based on error concealment information of other lost motion vectors, and wherein at least one of the first or second valid motion vectors is located between the lost motion vector and at least one of the first or second neighboring valid motion vectors within the same frame.

7. The apparatus of claim 6, wherein the recovering unit is further configured to generate the recovered motion vector of the lost motion vector using inverse distance weighting (IDW) that is an interpolation that estimates the lost motion vector using a weighted average of the valid motion vectors.

8. The apparatus of claim 7, wherein the lost motion vector is calculated as expressed in the following equation $$\frac{\sum_i w_i MV_i}{\sum_i w_i},$$

wherein $W_i$, is the weight, and $MV_i$, is each valid motion vector.

9. The apparatus of claim 6, wherein the second selecting unit determines at least one of a first left valid motion vector, a first top valid motion vector, and a first right valid motion vector as the first neighboring valid motion vector, and determines at least one of a second left valid motion vector, a second bottom valid motion vector, and a second right valid motion vector as the second neighboring valid motion vector, wherein the first left valid motion vector is closest to the left side of the first valid motion vector, the first top valid motion vector is closest to the top side of the first valid motion vector, the first right valid motion vector is closest to the right side of the valid first motion vector, and wherein the second left valid motion vector is closest to the left side of the second valid motion vector, the second bottom valid motion vector is closest to the bottom side of the second valid motion vector, the second right valid motion vector is closest to the right side of the second valid motion vector.

* * * * *